3,372,006
HALOGEN DERIVATIVES OF POLYHEDRAL
BORON COMPOUNDS
Bertrand L. Chamberland, Wilmington, Del., and Earl L. Muetterties, West Chester, Pa., assignors to E. I. du Pont de Nemours and Company, Wilmington, Del., a corporation of Delaware
No Drawing. Filed May 31, 1962, Ser. No. 199,574
12 Claims. (Cl. 23—358)

This invention relates to new compounds containing boron and to methods for preparing the compounds.

Boron compounds, principally salts of boric acid, have been in commercial use for many years. Recently other boron compounds, e.g., low molecular weight boron hydrides, have achieved technical importance in applications employing oxidizing and reducing agents. There are many potential applications, however, for which the available boron compounds are unsuited because of hydrolytic, oxidative or other types of instability. To illustrate, diborane, chlorodiborone, pentaborane(9) and trialkylboron compounds are spontaneously flammable in air. Diborane, pentaborane(9), chlorodiborane, boron trichloride, iododecarborane(14), and most other boron halides are hydrolyzed rapidly in water or alcohol. Even the most stable known borohydride, i.e., decaborane(14), is hydrolyzed at a moderate rate in water. Known ionic borohydrides, e.g., tetrahydroborates ($NaBH_4$, and the like), are hydrolyzed at a rapid rate at 100° C.

A broad class of boron compounds has now been found which show good hydrolytic and oxidative stability.

The novel boron compounds of this invention are polyborates of the following generic formula:

$$M_a(B_{20}H_{18-n}X_n)_b \quad (1)$$

where M is an atom or group of atoms which make up a cation having a valence of 1f–3, inclusive; X is halogen; n is a positive whole number of 1 to 18, inclusive; a and b are the smallest positive whole numbers which satisfy the equation:

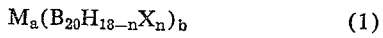

$$b = \frac{a \times \text{valence of M}}{2} \quad (2)$$

The substituent X is halogen, i.e., F, Cl, Br and I.

The compounds of Formula 1 are composed of two principal components which are represented by M and ($B_{20}H_{18-n}X_n$). These two principal components are joined by electrovalent or salt-like bonds which are characteristic for ionizable inorganic compounds. Each of these components will be discussed separately.

THE COMPONENT M

In Formula 1 M is a component which can consist of one element or more than one element which is ionically bonded to the boron-containing moiety. The component M, for simplicity, will be referred to as a group although it may contain only one atom or element. The groups represented by M are cations, i.e., bear a positive ionic charge and they have in common the property of forming positively charged groups or cations in water. The properties of the group M are not critical and the group, therefore, represents a broad range of elements or combinations of elements. To illustrate, M can be hydrogen, which in aqueous solution forms a hydronium ion ($H_3O^+$), a metal ammonium ($NH_4^+$), hydrazonium ($NH_2NH_3^+$) (also called hydrazinium), N-substituted ammonium, N-substituted hydrazinium ($NH_2NH_3^+$), aryldiazonium ($ArN_2^+$), sulfonium, phosphonium, metalammine, and the like.

The group M can be a metal of groups I-A, II-A, I-B and II-B having atomic numbers up to and including 80. Most preferred metals are the alkali and alkaline earth metals, i.e., lithium, sodium, potassium, rubidium, cesium, beryllium, magnesium, calcium, strontium and barium.

The group M can be a combination of a metal and ammonia or a metal and an amine, i.e., a Werner-type coordination complex referred to as a metal-ammine group. To illustrate, M can be $[Ni(NH_3)_6]^{+2}$, $[Zn(NH_3)_4]^{+2}$,

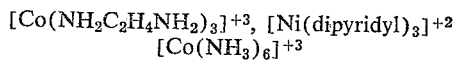

$$[Co(NH_2C_2H_4NH_2)_3]^{+3}, [Ni(dipyridyl)_3]^{+2}$$
$$[Co(NH_3)_6]^{+3}$$

The group M can be aryldiazonium, i.e., a group of the formula $ArN_2^+$, where Ar represents an aryl group. To illustrate, Ar can be phenyl, tolyl, xylyl, naphthyl, and the like.

The group M can be an N-substituted ammonium group, an S-substituted sulfonium group and a P-substituted phosphonium groups, which groups have the formulas $RNH_3^+$, $R_2NH_2^+$, $R_3NH^+$, $R_4N^+$, $R_2S^+$, and $R_4P^+$. R represents an organic group bonded to the nitrogen, sulfur or phosphorus. The R groups are not critical features of these cation groups; thus, R can be open-chain, closed-chain, saturated or unsaturated hydrocarbon or substituted hydrocarbon groups. R can be a heterocyclic ring of which the nitrogen, sulfur or phosphorus atom is a component part. Thus, when M is a substituted ammonium group, R can be derived from pyridine, quinoline, morpholine, hexamethyleneimine, and the like. Preferably R, for reasons of availability of reactants, contains at most 18 carbon atoms and can be alkyl, alkenyl, cycloalkyl, cycloalkenyl, aryl, aralkyl, alkaryl, cyanoalkyl or hydroxyalkyl. For example, R can be methyl, 2-ethylhexyl, octadecyl, allyl, cyclohexyl, cyclohexenyl, phenyl, naphthyl, anthryl, cyclohexylphenyl, diphenylyl, benzyl, chloroethyl, ω-cyanoamyl, β-hydroxyethyl, p-hydroxyphenyl, and the like.

The group M can also be an N-substituted hydrazonium (also called hydrazinium) radical having the formula $(RNHNH_3)^+$, $(R_2NNH_3)^+$, and the like, wherein R has the same definition as given in the preceding paragraph. To illustrate, the hydrazonium cation can be derived from phenylhydrazine, methylhydrazine, 1,1 - dimethylhydrazine, 1,2 - dimethylhydrazine, ethylhydrazine, 1,1-diethylhydrazine, and similar compounds.

The valence of the cation M will be between 1 and 3, i.e., M can have a valence of 1, 2, or 3. In most cases the valence of M will be 1 or 2. This group of compounds in which the valence of M is at most 2, are readily preparable and so form a preferred group of compounds in this invention.

THE GROUP ($B_{20}H_{18-n}X_n$)

The novel and characterizing feature of the compounds of the invention is the polyborate group $(B_{20}H_{18-n}X_n)^{-2}$. The group is represented generically as having a negative ionic charge of 2 and it behaves in chemical reactions as a divalent anion. The group chemically is exceptionally stable. It is not easily decomposed by hydrolysis, oxidation or reduction and it is resistant to thermal decomposition. The group is unchanged in simple metathetic reactions, a property which allows the preparation of a broad range of salts in which the cation is represented by M.

A pertinent feature in the boron-containing group is the substituent X which is bonded to boron. The number of substituents which can be present is not less than 1 or more than 18 and they can be alike or different.

CHARACTERISTICS OF THE COMPOUNDS

The compounds are generally crystalline solids with high-melting points which are characteristic of salts.

They are stable under conventional storage conditions and can be kept for prolonged periods without decomposition.

The compounds of the invention in which M forms a colorless cation, e.g., H, $NH_4$, the alkali metal or alkaline earth metals, are yellow in color. The acids and salts are generally soluble in hydroxylated solvents, e.g., water, alcohol, and the like, to form intensely yellow solutions.

The following examples illustrate the compounds of invention:

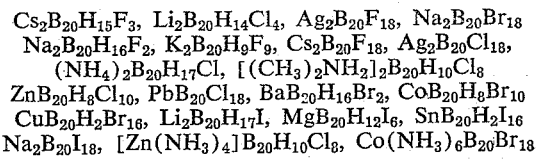

and the like. Representative compounds of the invention which are acids, i.e., compounds in which M is hydrogen or, in its hydrated form, hydronium ($H_3O^+$), are as follows:

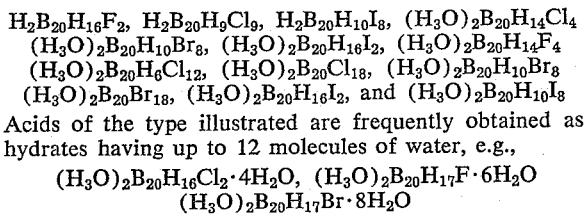

Acids of the type illustrated are frequently obtained as hydrates having up to 12 molecules of water, e.g., $$(H_3O)_2B_{20}H_{16}Cl_2 \cdot 4H_2O, \quad (H_3O)_2B_{20}H_{17}F \cdot 6H_2O$$
$$(H_3O)_2B_{20}H_{17}Br \cdot 8H_2O$$

and the like.

PREPARATION OF THE COMPOUNDS

Compounds of Formula 1 are obtained by reacting a compound of the formula $$M_a(B_{20}H_{18})_b \tag{3}$$

with a halogen. In Formula 3 M, $a$ and $b$ are defined as in Formula 1. Alternatively, $a$ and $b$ can be defined as the smallest whole numbers which satisfy the equation:

$$2b = a \times \text{valence of M} \tag{4}$$

The reactants of Formula 3 are not readily available compounds. For this reason, the preparation of a representative reactant is described in examples which are given later. Briefly, the reactants of Formula 3 are prepared by reacting a decahydrodecaborate(2−) with an oxidant containing a variable valence metal in its higher valence state, which oxidant has an oxidation-reduction potential in acid solution of about −1.33 to −1.61 volts, to obtain a product of Formula 3 in which the boron-containing group, $B_{20}H_{18}$, has a negative ionic charge or valence of 2.

The decahydrodecaborates(2−) employed as reactants to prepare compounds of Formula 3 have the general formula $$M_a(B_{10}H_{10})_b \tag{5}$$

where M, $a$ and $b$ are defined as in Formulas 1 and 3.

The compounds of Formula 5 which are employed as reactants are not commonly known and the preparation of representative compounds is also described in the examples. Any decahydrodecaborate(2−) can be employed, i.e., compounds in which M is any group which can form a cation in water, are operable. For reasons of availability and cost, it is preferred to use decahydrodecaborates of Formula 5 in which M is hydrogen, hydronium, ammonium, substituted ammonium, an alkali metal or an alkaline earth metal. Specific illustrations of the classes of preferred reactants are $H_2B_{10}H_{10}$ and its hydrates,

$[(CH_3)_2NH_2]_2B_{10}H_{10}$, and the like. These and other salts of $B_{10}H_{10}^{-2}$ are fully disclosed and claimed in U.S. Patents 3,148,938; 3,149,163 and 3,148,939.

The oxidizing reagent or oxidant is a compound having as a characteristic component a metal of variable valence, which metal is in its highest valence state, said compound having an oxidation-reduction potential in acid solution of about −1.33 to about −1.61 volts. The oxidation-reduction potential of a compound is a recognized and measurable property for which values are found in readily available texts, e.g., "Oxidation Potentials," by W. G. Latimer, 2nd Ed., Prentice-Hall, New York (1952), particularly p. 344. Examples of classes of compounds which are operable in the process are dichromates, aurates, higher oxides of lead, manganic salts, permanganates, higher oxides of bismuth and salts of tetravalent cerium.

The oxidation process is conducted by simple and uncomplicated procedures in conventional equipment. A solvent is generally employed which preferably is hydroxylated, e.g., methanol, water, and the like. Water is most conveniently used and it is therefore the preferred solvent.

The ratio in which the reactants are employed is not a critical factor for operability. However, the use of an excess of oxidant may lead to a decrease in yield of the desired product. It is preferable to employ at most two oxidation equivalents of the oxidant (based on the metal) per mole of $B_{10}H_{10}^{-2}$ salt or acid used in the process. The preferred mole ratio of oxidant to polyhydropolyborate can be determined by methods described in Handbook of Chemistry and Physics, 38th Ed., p. 1588, Chemical Rubber Publishing Co. (1956).

Pressure is not a critical factor in the process and atmospheric pressure is normally used. However, if desired, pressures higher or lower than atmospheric can be employed. The temperature of the reaction is also not critical. Normally, the reaction is conducted at prevailing atmospheric temperature but temperatures as low as 0° C. and as high as 100° C. can be employed. Preferred temperatures of operation lie between about 10° and 75° C.

The reaction proceeds rapidly and a measurable quantity of product is obtained within a short time. Normally the reactants are maintained in contact for a sufficient period to assure maximum yield. The time of reaction can range from a few minutes to 24 hours or more.

In the operation of the process it is preferable (although not essential) to add the oxidant to the decaborate to reduce the vigor of the reaction and to obtain the maximum yield of desired product. Normally, therefore, the reaction vessel is charged with the solvent and the decahydrodecaborate. The chemical oxidant, which is conveniently handled in solution, is added gradually to the vessel at a rate which provides a controllable reaction. After all of the oxidant has been added, the reaction mixture can be stirred for a short period and a solution containing the desired cation (M) is added. The polyborate salt frequently precipitates at this point but, in the event precipitation does not occur, the solution is evaporated to a volume at which the solid separates. The product is purified by conventional procedures to obtain a salt of the divalent anion, $B_{20}H_{18}^{-2}$.

*Halogenation reactions.*—Salts or the acid of the $B_{20}H_{18}^{-2}$ anion can be employed for halogenations.

To obtain a halogenated divalent compound of Formula 1, i.e., a compound having the $B_{20}H_{18-n}X_n^{-2}$ anion, where $n$ is at least 1, a salt of $B_{20}H_{18}^{-2}$ is reacted with a mild halogenating agent, e.g., an N-halogenated amide, N-halogenated imide, N-halogenated sulfonamide, and the like. To illustrate, N-chloroacetamide, N-bromophthalimide, N-iodophthalimide, and like compounds can be used as halogenating agents.

To obtain fluorinated compounds, the divalent eicosaborate in aqueous solution can be reacted with elemental fluorine highly diluted with nitrogen gas.

The reaction is usually conducted in an aqueous medium containing a polar water-miscible solvent to facilitate solution of the reactants. A solution of a salt of a $B_{20}H_{18}^{-2}$ anion is prepared and the halogenating agent is added to it gradually. The organic halogenating agent, e.g., N-haloamide, is conveniently used in solution. The mode of addition is not critical and it is conducted by whatever method is most convenient. The reaction generally proceeds rapidly at prevailing atmospheric temperature; if desired, heating can be used to increase the rate.

The ratio of reactants is not critical but it is preferred to use the halogenating agent in sufficient quantity to obtain a product with the desired number of halogen substituents. The ratio, moles halogenating agent/mole $B_{20}H_{18}$ salt, usually lies between about 0.5 and 50; preferably, the ratio is from 1.0 to about 30.

Time, temperature and pressure are not critical factors in the process. The temperature can lie between about 10° C. and the boiling point of the solvent. The temperature generally does not exceed 150° C. The pressure is preferably atmospheric but it can be higher or lower than atmospheric.

Compounds of Formula 1, where the X groups are unlike, can be obtained by partially halogenating compounds of Formula 3 with one halogen, e.g., a reagent which will introduce chlorine, followed by further partial halogenation with a second halogen, e.g., a reagent which will introduce bromine, and if desired, halogenation with a third halogen, e.g., a reagent which will introduce iodine. The procedure can be modified to obtain whatever combination of halogens is desired in the products.

An optional method of obtaining the halogenated product is to halogenate the decahydrodecaborate salt prior to the oxidation step. To illustrate, the salt $M_a(B_{10}H_{10})_b$ can be reacted with a halogen to obtain $M_a(B_{10}H_{10-y}X_y)_b$, where M, X, $a$ and $b$ are defined as in Formula 1, and $y$ is a positive whole number of 1–10, inclusive. Halogenation is conducted in the manner described in the preceding paragraphs for the $B_{20}H_{18}^{-2}$ salt. The halogenated salt is oxidized by the method described earlier. To illustrate, $(NH_4)_2B_{10}H_{10}$ is reacted with chlorine to yield $(NH_4)_2B_{10}Cl_{10}$; the latter compound is oxidized to form $(NH_4)_2B_{20}Cl_{18}$.

*Metathetic reactions.*—Compounds of Formula 1, wherein M covers a wide range of cations are obtained by simple metathetic reactions. To illustrate, an aqueous solution of a compound of Formula 1, where M is $NH_4^+$, is contacted with a strong acid or with a strongly acidic cation exchange resin to obtain the free acid, i.e., a compound of Formula 1 in which M is H. The acid, generally in solution, is reacted with oxides of metals, hydroxides of metals, salts of metals (both organic and inorganic), nitrogen bases, sulfonium hydroxides or halides, phosphonium hydroxides or halides, aryldiazonium hydroxides or halides, and similar types of compounds to obtain products of Formula 1 which have the desired cation M. In a process employing an ion-exchange resin, strongly acidic resins of the sulfonic acid variety are preferred because of availability, e.g., "Amberlite" IR–120–H and "Dowex" 50. The acid, so obtained in aqueous solution, can be reacted with nitrates, chlorides, bromides, acetates, benzoates and similar salts of metals or other bases to obtain salts of Formula 1.

To illustrate, an aqueous solution of $Cs_2B_{20}H_8Cl_{10}$ is passed through a column packed with "Amberlite" IR–120–H to obtain in aqueous solution the acid $H_2B_{20}H_8Cl_{10}$. The aqueous solution is evaporated under reduced pressure to obtain the acid $H_2B_{20}H_8Cl_{10}$, generally as a solid hydrate having up to 12 molecules of water.

It is convenient to isolate the acids as hydrates. In the hydrated form part of the water of hydration is considered to be associated with the ionizable protons. In general, up to molecule of water is associated with each ionizable proton and the acids can be represented as having hydrated protons, e.g., $(H_3O)_2B_{20}H_8Cl_{10}$, $(H_3O)_2B_{20}H_{15}Cl_3 \cdot 4H_2O$, $(H_3O)_2B_{20}H_{10}Br_8 \cdot 6H_2O$ and the like. It is understood that when reference is made to the acids of 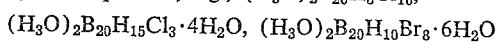 anions, the hydrates of these acids are included. These hydrates generally have at most 12 molecules of water.

Examples of other acids which can be obtained and the salts from which they can be derived are as follows:

| Compound: | Acid obtained |
|---|---|
| $(NH_4)_2B_{20}H_{12}F_6$ | $H_2B_{20}H_{12}F_6$ |
| $Na_2B_{20}H_{14}Cl_4$ | $H_2B_{20}H_{14}Cl_4$ |
| $Cs_2B_{20}Cl_{18}$ | $H_2B_{20}Cl_{18}$ |
| $(NH_4)_2B_{20}H_{10}Br_8$ | $H_2B_{20}H_{10}Br_8$ |
| $BaB_{20}H_{15}I_3$ | $H_2B_{20}H_{15}I_3$ |
| $CaB_{20}I_{18}$ | $H_2B_{20}I_{18}$ |
| $Na_2B_{20}H_{16}F_2$ | $H_2B_{20}H_{16}F_2$ |
| $Cs_2B_{20}H_{10}Cl_8$ | $H_2B_{20}H_{10}Cl_8$ |
| $MgB_{20}H_6Br_{12}$ | $H_2B_{20}H_6Br_{12}$ |
| $[(CH_3)_4N]_2B_{20}Cl_{18}$ | $H_2B_{20}Cl_{18}$ |
| $(NH_4)_2B_{20}Br_{18}$ | $H_2B_{20}Br_{18}$ |
| $(CH_3NH_3)_2B_{20}H_2I_{16}$ | $H_2B_{20}H_2I_{16}$ |

Careful concentration of the solutions of the acids and intensive drying under low pressure and moderate temperature of the liquid residues yields the acids, generally as hydrates as discussed earlier. For many chemical reactions it is not necessary to isolate the acids from solution. The solutions of the acids can be employed directly, especially in metathetic reactions.

Metal salts of the invention can be prepared by neutralization of the acids, obtained as described above, in aqueous or alcohol solution with an aqueous solution or suspension of an inorganic base, e.g., an alkali or alkaline earth metal hydroxide. The resulting aqueous solution of the metal salt of the $B_{20}H_{18-n}X_n)^{-2}$ anion is concentrated by evaporation of water or alcohol until the salt crystallizes out. In many cases the salt may precipitate during its preparation and evaporation of the solution is not necessary. The crystalline salt is dried under reduced pressure, e.g., 0.1 mm. of mercury, and moderately elevated temperature, e.g., 50–100° C. The metal salts frequently contain water of hydration which can be removed by heating for several hours at a temperature of about 200° C. under low pressure, e.g., 0.1 mm. mercury or lower. Specific examples of salts which can be obtained by the process described above are $Na_2B_{18}H_{10}Cl_8$, $K_2B_{20}H_{13}Br_5$, $Li_2B_{20}H_3Br_{15}$, $Cs_2B_{20}Cl_{18}$, $MgB_{20}H_{14}I_4$ $BaB_{20}H_{13}BrI_4$, $CaB_{20}H_9Cl_9$, and $SrB_{20}H_{15}F_3$.

Water-insoluble heavy metal salts of the acids can be prepared by adding a water-soluble heavy metal salt, e.g., silver nitrate or mercuric nitrate, to an aqueous solution of the boron-containing acid whereupon the heavy metal salt of the anion precipitates out as a white or light colored solid. The salts formed in this procedure are usually anhydrous. Examples of heavy metal salts which can be prepared by this method from halo-substituted compounds are: $HgB_{20}H_2Cl_{16}$, $HgB_{20}H_5Br_{13}$, $Ag_2B_{20}H_{16}Br_2$, and $Ag_2B_{20}Br_{18}$ The procedure is generic to the preparation of metal salts of the compounds of the invention and it can be employed with compounds bearing a wide range of X groups.

Nitrates, carbonates, chlorides or oxides of metals can be used to prepare the salts by the methods described earlier.

Light-sensitive salts, e.g., the silver salt, are preferably prepared under conditions providing minimum exposure to light although exclusion of light is not essential for operability.

Compounds of Formula 1 where M is an alkali or alkaline earth metal, e.g., Na, K, Cs, Ca, Ba, Mg, and Sr, can undergo simple metathetic reactions with other salts to effect an exchange of cations. Thus, $Na_2B_{20}H_{15}Cl_3$ or $K_2B_{20}H_{12}F_6$ can be reacted in aqueous solution with ammonium sulfate, benzenediazonium hydroxide, pyridinium chloride, morpholinium sulfate, polyethyleneimine hydrochloride, and the like, to form compounds of Formula 1 having ammonium, benzenediazonium, pyridinium, morpholinium, and the like, as cations. These illustrations are not limiting and they demonstrate the breadth of metathetic reactions which can be used.

Compounds of the invention in which the group M is a metal or a Werner-type complex, frequently contain solvent of crystallization when isolated by conventional methods. The solvent, e.g., water, can be bound loosely in the lattices of the crystals or it can be associated by stronger bonds with the metal cation or Werner-type complex cation. Solvent of crystallization, entrapped in crystal lattices, is removed easily by well-known procedures, e.g., heating under reduced pressure. Solvent of crystallization which is associated with the cation is more difficult to remove, and for most applications, it is not necessary to remove completely this type of bound solvent.

The products of the invention and processes for obtaining them are illustrated in the following examples. The preparation of a representative compound of the type $M_a(B_{10}H_{10})_b$, which is employed as a principal reactant, is also illustrated.

Example A

A. PREPARATION OF BIS(DIMETHYL SULFIDE) DECABORANE(12)

A reaction vessel having a capacity of about 365 g. of water is charged with 0.79 g. of decaborane(14), cooled in liquid nitrogen, and then evacuated to a pressure of 10 microns of mercury. Approximately 21 g. of dimethyl sulfide is condensed onto the decaborane in the reaction vessel. The reaction vessel is closed, allowed to warm to room temperature and stand for 4 days. During this time, 6.6 millimoles of hydrogen is evolved. The reaction vessel is opened and excess dimethyl sulfide is removed by distillation, leaving a practically quantitative yield of white solid residue of $B_{10}H_{12} \cdot 2(CH_3)_2S$. The compound is recrystallized from ethyl acetate and it melts at 122–124° C. The compound is called bis(dimethyl sulfide)decaborane(12).

B. PREPARATION OF $M_2B_{10}H_{10}$ (WHERE M IS $NH_4$)

Bis(dimethyl sulfide)decaborane(12) (8.5 g.) is mixed with 50 ml. of liquid ammonia and stirred in a round-bottom reaction vessel for 1 hour with the vessel being cooled to a temperature of about −50° C. by partial immersion in a bath of a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of $(NH_4)_2B_{10}H_{10}$.

Example B

A. A reaction vessel is charged with 100 ml. of water and 1.46 g. of $(NH_4)_2B_{10}H_{10}$. The mixture is stirred and a solution of 5.4 g. of $Ce(NH_4)_2(NO_3)_6$ in 80 ml. of water is added gradually. Evolution of gas occurs and a deep blue-violet solution forms. A concentrated aqueous solution of $(CH_3)_4NCl$ is added to the reaction mixture with stirring and in sufficient amount to precipitate completely a violet-colored solid. The solid is separated by filtration and it is purified by crystallization from hot water to yield the yellow compound, bis(tetramethylammonium)octadecahydroeicosaborate(2−).

The compound is soluble in acetonitrile, hot methanol and hot water. The identity of the product is confirmed by elemental analysis.

*Analysis.*—Calc'd for $[CH_3)_4N]_2B_{20}H_{18}$: C, 25.10; H, 11.06; N, 7.32; B, 56.54; Eq. Wt., 191.4. Found: C, 26.28; H, 11.49; N, 7.55, 7.80; B, 54.28; Eq. Wt., 188, 204.

The identity of the compound is further confirmed by measuring the number of moles of hydrogen obtained from the boron moiety ($B_{20}H_{18}$) upon complete hydrolysis to boric acid. The values for moles $H_2$ obtained per mole 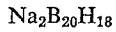 $[(CH_3)_4N]_2B_{20}H_{18}$, are as follows: Calc'd, 40.0. Found: 39.904 and 40.086.

B. A solution of $[(CH_3)_4N]_2B_{20}H_{18}$ in methanol-water is passed through a column packed with a commercial acidic ion-exchange resin of the polysulfonic acid type. The effluent is a solution of the acid $H_2B_{20}H_{18}$, or, expressed as a hydronium acid, $(H_3O)_2B_{20}H_{18}$. The aqueous solution is used without further processing to prepare salts of the acid.

C. A portion of an aqueous solution of the dibasic acid, prepared as described in Part A, is titrated with an aqueous solution of sodium hydroxide until the reaction mixture is neutral (pH=7). The resulting aqueous solution is yellow and its ultraviolet spectrum shows absorption in regions which are characteristic for salts of the $B_{20}H_{18}$ anion.

The yellow solution is evaporated to dryness under reduced pressure (less than 1 mm. of Hg) to obtain crude $Na_2B_{20}H_{18}$ as a tan-colored solid. The compound is purified by crystallization from methanol. The product so obtained contains water of crystallization.

*Analysis.*—Calc'd for $Na_2B_{20}H_{18} \cdot 2H_2O$: B, 68.34; H, 7.07. Found: B, 68.21; H, 7.25.

The compound can, if desired, be obtained free of solvent of crystallization by heating for a time at very low pressure. The molecular weight of the compound $$Na_2B_{20}H_{18}$$

determined by freezing point depression in aqueous solution gives the following values: 103, 99, 89, 88, i.e., an average mol. wt. of 95; calc'd value: 93.3.

Example I

A reaction vessel is charged with 100 ml. of $CH_3CN$ and 5.73 g. of $[(CH_3)_4N]_2B_{20}H_{18}$, prepared as described in Example B, Part A. The mixture is stirred and a solution consisting of 20.03 g. of N-chlorosuccinimide, 50 ml. of $CH_3CN$ and 100 ml. of water is added with stirring. The mixture is heated to boiling for a period of time until a solid forms. The solution is cooled to about 25° C. and large yellow crystals form. The crystals are separated and recrystallized from acetonitrile-water solution to obtain $[(CH_3)_4N]_2B_{20}H_{12}Cl_6$. The identity of the product is confirmed by elemental analysis.

*Analysis.*—Calc'd for  $[(CH_3)_4N]_2B_{20}H_{12}Cl_6$: C, 16.30; H, 6.16; B, 36.71; Cl, 36.08; N, 4.75. Found: C, 16.80, 16.70; H, 6.25, 6.36; B, 36.18, 36.10; Cl, 36.93, 36.75; N, 4.51, 4.64.

EXAMPLE II

A reaction vessel is charged with 3.82 g. of $$[(CH_3)_4N]_2B_{20}H_{18}$$

50 ml. of $CH_3CN$ and 20 ml. of $CH_3OH$. The mixture is stirred and a solution consisting of 8.90 g. of N-bromosuccinimide, 50 ml. of $CH_3CN$ and 20 ml. of $CH_3OH$ is added. The reaction mixture is warmed on a hot plate until about half of the solution evaporates. Water is added to the solution and it is warmed again until the organic solvents are removed. The remaining aqueous solution is cooled to about 25 C. and a yellow solid precipitates. The solid is separted and it is recrystallized from acetonitrile-water solution to obtain 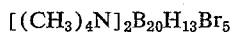

$$[(CH_3)_4N]_2B_{20}H_{13}Br_5$$

The ultraviolet spectrum of the compound in solution in $CH_3CN$ shows absorption peaks at 242 mμ and 307 mμ.

*Analysis.*—Calc'd for $[(CH_3)_4N]_2B_{20}H_{13}Br_5$: C, 12.36; H, 4.80; B, 27.84; Br, 51.40. Found: C, 12.92; H, 5.15; B, 27.98; Br, 49.53.

EXAMPLE III

A reaction vessel is charged with 3.82g. of 

$$[(CH_3)_4N]_2B_{20}H_{18}$$

50 ml. of $CH_3CN$ and 20 ml. of $CH_3OH$. The reaction mixture is stirred and a solution containing 20.25 g. of N-iodosuccinimide, 75 ml. of CH$_3$CN and 50 ml. of CH$_3$OH is added with stirring. The solution is processed as described in Example II to obtain light yellow crystals of [(CH$_3$)$_4$N]$_2$B$_{20}$H$_9$I$_9$ associated with (CH$_3$)$_4$NI.

*Analysis.*—Calc'd for [(CH$_3$)$_4$N]$_2$B$_{20}$H$_9$I$_9$·(CH$_3$)$_4$NI: C, 8.39; H, 2.64; B, 12.60; I, 73.94. Found: C, 8.68; H, 2.77; B, 12.32; I, 73.87.

Examples I–III illustrate the preparation of compounds of the invention bearing a halogenated divalent anion, i.e., (B$_{20}$H$_{18-n}$X$_n$)$^{-2}$. The process is generic to the preparation of this class of compounds.

Compounds containing mixed halogens can be obtained by the processes of Examples I–III. To illustrate, the product of Example I can be used as a reactant in the process of Example III to obtain a compound having chlorine and bromine as substituents, e.g.,

[(CH$_3$)$_4$N]$_2$B$_{20}$H$_8$Cl$_5$Br$_5$

Compounds bearing fluorine as substituents can be obtained by passing a mixture of fluorine and nitrogen gas into a solution of an eicosaborate salt. To illustrate, the compound obtained in Example I can be fluorinated to form a fluorine-bearing salt, e.g.,

[(CH$_3$)$_4$N]$_2$B$_{20}$H$_8$Cl$_5$F$_5$

Aqueous or alcohol solutions of the compounds of Examples I–III can be passed through an acid ion-exchange resin to obtain free acids of the formulas H$_2$B$_{20}$H$_{12}$Cl$_6$, H$_2$B$_{20}$H$_{13}$Br$_5$ and H$_2$B$_{20}$H$_9$I$_9$. Solutions of the acids can be neutralized, e.g., with NaOH to obtain Na$_2$B$_{20}$H$_{12}$Cl$_6$, Na$_2$B$_{20}$H$_{13}$Br$_5$ and Na$_2$B$_{20}$H$_9$I$_9$, with LiOH to obtain the corresponding lithium salts or with KOH or CsOH to obtain the corresponding lithium and cesium salts. Other basic reactants can be employed in a similar manner, as described earlier, to obtain salts. Thus, aqueous solutions of the acids can be neutralized with solutions of zinc hydroxide in ammonia, cobalt hydroxide in ammonia or copper salts in ethylenediamine to obtain, e.g., Zn(NH$_3$)$_4$B$_{20}$H$_{12}$Cl$_6$, Co(NH$_3$)$_6$B$_{20}$H$_{13}$Br$_5$ and Cu(ethylene diamine)B$_{20}$H$_9$I$_9$.

Aqueous solutions can be neutralized with ammonium hydroxide, isobutylamine, octadecylamine, allylamine, and the like to obtain, e.g., (NH$_4$)$_2$B$_{20}$H$_{12}$Cl$_6$, (C$_3$H$_7$NH$_3$)$_2$B$_{20}$H$_{13}$Br$_5$ C$_{18}$H$_{37}$NH$_3$)$_2$B$_{20}$H$_9$I$_9$, (C$_3$H$_5$NH$_3$)$_2$B$_{20}$H$_{12}$Cl$_6$, and similar salts.

UTILITY

The invention provides a broad class of new boron compounds which find applications in many fields.

The compounds of the invention, particularly the less highly substituted products, are useful as impregnating agents in the preparation of resistors. To illustrate, a section of a cotton string is immersed in a nearly saturated solution of [(CH$_3$)$_4$N]$_2$B$_{20}$H$_{12}$Cl$_6$ in a mixture of acetonitrile and water. The string is withdrawn from the solution and the solvent is removed by drying in air. A free flame is applied to the dried impregnated string and it burns with difficulty to yield a coherent ash which in size and shape resembles the original string. The residual skeleton is of sufficient coherence to permit embedding in paraffin. The section of residue, so treated, shows a resistance on the order of 5000 ohms/cm. The residue from a control section of string is very small and shapeless and it cannot be handled.

In the group of compounds which fall within the scope of Formula 1, the component M represents a range of groups which are readily interchangeable by metathetic reactions as described earlier. All of the salts which fall within the scope of Formula 1 can be used to prepare the group of acids represented generically as H$_2$B$_{20}$H$_{18-n}$X$_n$ or, in aqueous solution, as (H$_3$O)$_2$B$_{20}$H$_{18-n}$X$_n$ by passing aqueous or alcoholic solutions of the salts through an acidic ion-exchange resin as described earlier. The acids of this group are strong acids and they are useful in industrial applications where it is desired to avoid contamination from sulfate, chloride, bromide, chlorate, phosphate, and like strong acid anions. Thus, the acids are useful for etching metals, such as steel, and for rust removal, for pickling, for scale removal and for similar metal processing operations.

The acids, described above, are useful as catalysts in the preparation of esters, e.g., in the reaction of alcohols and organic carboxylic acids, to improve the yields of the desired esters. The acids of the invention are employed for this purpose in the same manner as p-toluenesulfonic acid, sulfuric acid or alcoholic hydrogen chloride.

Aqueous solutions of the acids are useful as agents for absorbing noxious basic materials from the air, e.g., traces of ammonia, lower alkyl amines and the like. To illustrate, air contaminated with methylamines is passed through an aqueous solution of H$_2$B$_{20}$H$_{12}$Cl$_6$ or a solution of H$_2$B$_{20}$H$_{13}$Br$_5$ and the amines are removed.

All of the compounds of the invention are useful as components of fireworks compositions to impart a pleasing color and sparkle to the display, e.g., [(CH$_3$)$_4$N]$_2$B$_{20}$H$_{12}$Cl$_6$, [(CH$_3$)$_4$N]$_2$B$_{20}$H$_{13}$Br$_5$, and like salts, such as the strontium, magnesium and cobalt salts, can be used in such compositions.

The silver salts, i.e., the compounds of Formula 1, where M is Ag, in the presence of an excess of silver ion, reduce the ion to metallic silver. These compounds are, therefore, useful in the photographic arts and in the preparation of printed circuits. To illustrate, a cellulosic sheet is immersed for a few minutes in an aqueous solution of silver nitrate and dried in air. A solution of a compound of Formula 1, e.g., the tetramethylammonium salt of Example I, is applied to the dried impregnated sheet and a deposit of metallic silver forms on the sheet at the points of application. Further, a cellulose sheet is immersed for a few minutes in a solution of a salt of Formula 1, e.g., the compound of Example III, and dried in air. A solution of AgNO$_3$ is applied to the dried sheet and a deposit of metallic silver forms on the sheet.

As many apparently satisfactorily different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

M$_2$(B$_{20}$H$_{18-n}$X$_n$)$_b$ wherein M is a cation having a valence of 1–3, inclusive, and is selected from the class consisting of
  hydrogen,
  hydronium,
  metal selected from Groups I and II of the Periodic Table having an atomic number of up to 80,
  ammonium,
  hydrazonium,

[Ni(NH$_3$)$_6$]$^{+2}$, [Zn(NH$_3$)$_4$]$^{+2}$
[Co(NH$_2$C$_2$H$_4$NH$_2$)$_3$]$^{+3}$, [Ni(dipyridyl)$_3$]$^{+2}$
[Co(NH$_3$)$_6$]$^{+3}$, [Co(NH$_3$)$_4$]$^{+2}$ aryldiazonium of 6–10 carbon atoms,
  S-substituted sulfonium,
  P-substituted phosphonium,
  N-substituted ammonium,
  N-substituted hydrazinium
    wherein the substituents on the S, P and N atoms are selected from the class consisting of alkyl, alkenyl, cycloalkyl, cycloalkenyl, aryl, aralkyl, alkaryl, cyanoalkyl and hydroxyalkyl, wherein each of the immediately above groups contains at most 18 carbon atoms, X is halogen, $n$ is a positive number of 1–18, inclusive; and $a$ and $b$ are the smallest whole numbers which satisfy the equation $$b = \frac{a \times \text{valence of M}}{2}$$

2. A compound of claim 1 in the hydrated form.
3. $[(CH_3)_4N]_2B_{20}H_{12}Cl_6$.
4. A compound of claim 3 in the hydrated form.
5. $H_2B_{20}H_{12}Cl_6$.
6. A compound of claim 5 in the hydrated form.
7. $[(CH_3)_4N]_2B_{20}H_{13}Br_5$.
8. A compound of claim 7 in the hydrated form.
9. $Na_2B_{20}H_{12}Cl_6$.
10. A compound of claim 9 in the hydrated form.
11. $Zn(NH_3)_4B_{20}H_{12}Cl_6$.
12. A compound of claim 11 in the hydrated form.

References Cited

UNITED STATES PATENTS

| | | | |
|---|---|---|---|
| 2,756,259 | 7/1956 | Bragdon et al. | 260—567.6 |
| 3,018,160 | 1/1962 | Miller | 23—14 |
| 3,021,190 | 2/1962 | McElroy | 23—14 |
| 3,108,139 | 10/1963 | Larchar | 260—567.6 |
| 3,148,938 | 9/1964 | Knoth | 23—358 |
| 3,148,939 | 9/1964 | Knoth | 23—358 X |
| 3,149,163 | 9/1964 | Knoth | 260—583 |
| 3,166,378 | 1/1965 | Knoth | 23—361 |

OTHER REFERENCES

Kaczmarczyk et al., "Proceedings of the National Academy of Sciences, U.S.A.," vol. 48, pp. 729–733 (May 1962).

Wiesboeck et al., "Journal of the American Chemical Society," vol. 83, pp. 4108–4109 (Oct. 5, 1961).

MILTON WEISSMAN, *Primary Examiner.*

MAURICE A. BRINDISI, *Examiner.*

PO-1050
(5/69)

UNITED STATES PATENT OFFICE
CERTIFICATE OF CORRECTION

Patent No. 3,372,006        Dated    March 5, 1968

Inventor(s) Bertrand L. Chamberland and Earl L. Muetterties

It is certified that error appears in the above-identified patent and that said Letters Patent are hereby corrected as shown below:

Col. 1, line 37, " 1f-3" should be changed to -- 1-3 --; line 65, insert a comma after "metal";

Col. 2, line 19, "groups" should be -- group --;

Col. 9, line 33, "I1OH" should be -- LiOH --; and

Signed and sealed this 14th day of September 1971.

(SEAL)
Attest:

EDWARD M. FLETCHER, JR.      ROBERT GOTTSCHALK
Attesting Officer              Acting Commissioner of Patents

UNITED STATES PATENT OFFICE
CERTIFICATE OF CORRECTION

Patent No. 3,372,006        Dated March 5, 1968

Inventor(s) Bertrand L. Chamberland et al.

It is certified that error appears in the above-identified patent and that said Letters Patent are hereby corrected as shown below:

Column 1, line 37, "1f-3" should read -- 1-3 --; line 65, after "metal" insert a comma; Column 2, line 19, "groups" should read -- group --. Column 9, line 33, "IiOH" should read -- LiOH --. Column 10, line 51, "$M_2(B_{20}H_{18-n})_b$" should read -- $M_a(B_{20}H_{18-n})_b$ --.

Signed and sealed this 22nd day of February 1972.

(SEAL)
Attest:

EDWARD M. FLETCHER, JR.         ROBERT GOTTSCHALK
Attesting Officer             Commissioner of Patents